United States Patent [19]

VanNoord

[11] Patent Number: 5,111,940
[45] Date of Patent: May 12, 1992

[54] STORAGE RACK ASSEMBLY

[75] Inventor: Andrew J. VanNoord, Grand Rapids, Mich.

[73] Assignee: Kent Design & Manufacturing, Inc., Grand Rapids, Mich.

[21] Appl. No.: 305,429

[22] Filed: Feb. 1, 1989

Related U.S. Application Data

[63] Continuation-in-part of Ser. No. 111,442, Oct. 21, 1987, Pat. No. 4,887,725.

[51] Int. Cl.$^5$ .............................................. A47B 63/00
[52] U.S. Cl. ...................................... 211/41; 211/162; 211/181
[58] Field of Search ............... 211/40, 41, 119, 191, 211/181, 42, 43, 46, 11, 184, 162; 312/9, 10, 15, 17, 12; 206/387; 108/60, 61

[56] References Cited

U.S. PATENT DOCUMENTS

| | | |
|---|---|---|
| 451,729 | 5/1891 | Dom ...................................... 211/11 |
| 1,074,796 | 10/1913 | Jones ............................... 211/162 X |
| 1,407,938 | 2/1922 | Gallaway . |
| 2,532,673 | 12/1950 | Mossett . |
| 2,720,204 | 10/1955 | Wallach . |
| 2,892,548 | 6/1959 | Huff . |
| 2,916,153 | 12/1959 | Saul, Jr. . |
| 2,959,293 | 11/1960 | Von Meyer . |
| 3,114,459 | 12/1963 | Kersting . |
| 3,318,453 | 5/1967 | Cavanagh . |
| 3,347,393 | 10/1967 | Frey . |
| 3,446,360 | 5/1969 | Gutierrez . |
| 3,800,958 | 4/1974 | Dorn . |
| 4,162,013 | 7/1979 | Tucker .................................. 211/43 |
| 4,411,481 | 10/1983 | Berkman . |
| 4,592,600 | 6/1986 | Bohnet et al. . |
| 4,647,118 | 3/1987 | Kamperman . |
| 4,650,072 | 3/1987 | Ackeret . |
| 4,655,345 | 4/1987 | Drake et al. . |
| 4,657,146 | 4/1987 | Walters . |
| 4,705,169 | 11/1987 | Mastronardo ..................... 312/12 X |
| 4,744,463 | 5/1988 | Merzon ................................ 312/12 |
| 4,782,949 | 11/1988 | Berkman .............................. 312/9 X |

FOREIGN PATENT DOCUMENTS

| | | |
|---|---|---|
| 1255724 | 6/1961 | France . |
| 2428299 | 6/1978 | France . |
| 350090 | 7/1957 | Switzerland . |
| 8102829 | 10/1981 | World Int. Prop. O. . |

Primary Examiner—Sarah A. Lechok
Attorney, Agent, or Firm—Varnum, Riddering, Schmidt & Howlett

[57] ABSTRACT

A storage rack assembly comprises a rack (10) formed of a base (20) and U-shaped wires (21) forming side supports in which the rack (10) is used for storing articles such as audio and video cassettes (14, 12) and compact disc containers (16) on shelves, cabinets and the like. The U-shaped wires (21) are parallel to each other and extend transversely across the rack (10) in spaced relationship. The rack (10) may be of a knockdown type. Specifically, the wires (21) may have laterally extending feet (30) that removably fit within channels (78) in the base (20) so the rack (10) can be assembled and disassembled. A track (34) slidably mounts the rack (10) for sliding movement with the rack (10) and is mountable on a shelf or in a cabinet. The cassettes (14, 12) and disc containers (16) lie vertically between the wires (21) and across the base (20), resting on step portions extending along the longitudinal sides of the base. The step portions accommodate storage of various sizes of cassettes and discs (14, 12, 16).

12 Claims, 3 Drawing Sheets

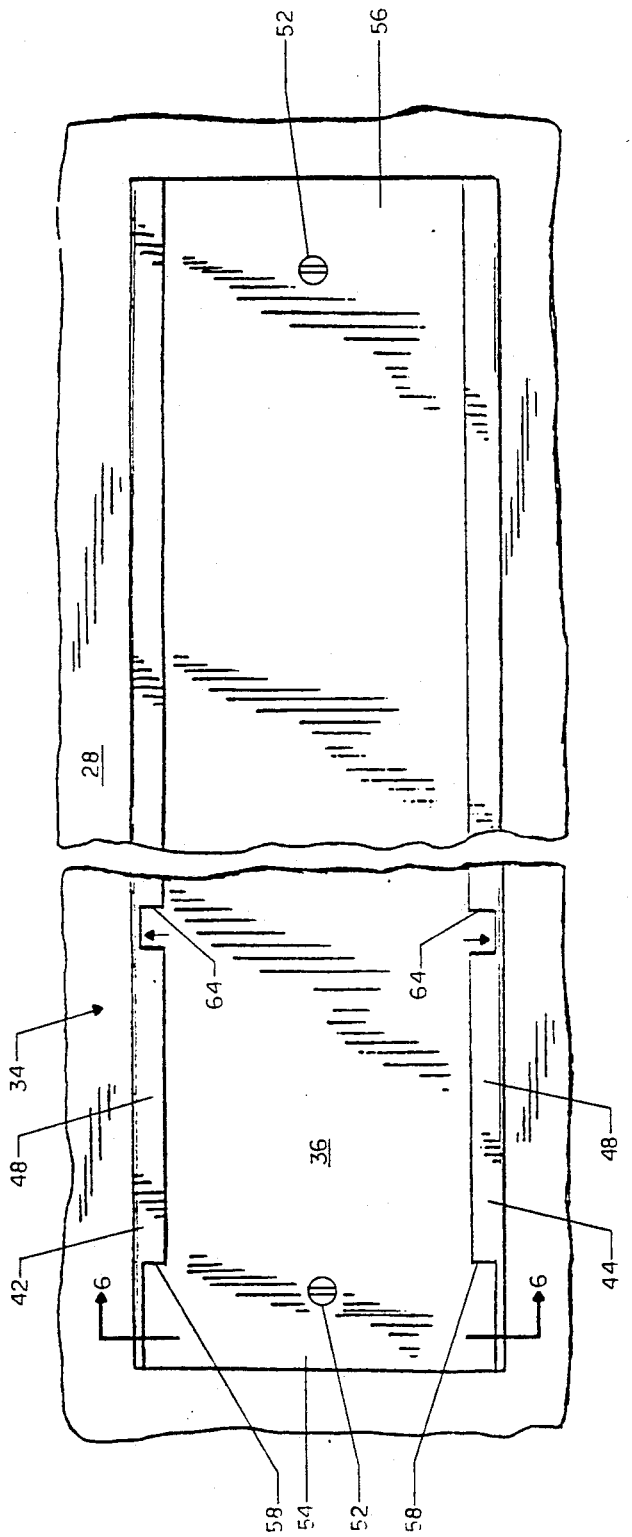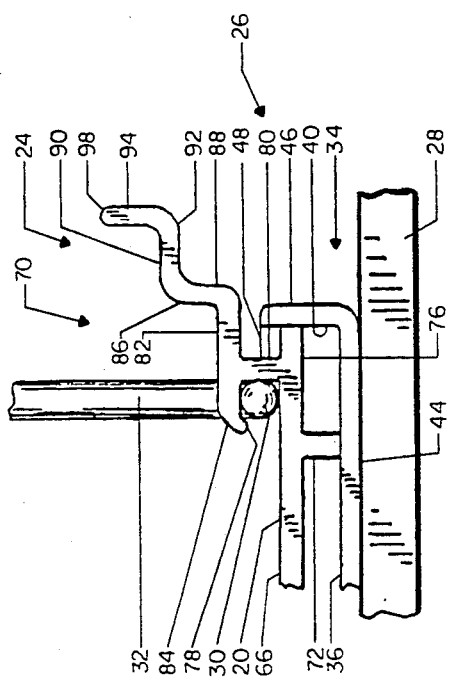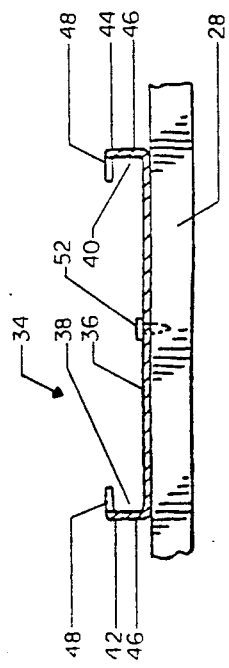

STORAGE RACK ASSEMBLY

CROSS-REFERENCE TO RELATED APPLICATION

This application is a continuation-in-part application of U.S. patent application Ser. No. 07/111,442 filed Oct. 21, 1987, now U.S. Pat. No. 4,887,725 and entitled STORAGE RACK ASSEMBLY.

BACKGROUND OF THE INVENTION

1. Field of the Invention

This invention relates to storage apparatus and, more particularly, relates to apparatus for storing items such as audio and video cassettes and compact discs in a space-efficient manner, while still facilitating access and visibility in an attractive manner.

2. State of the Prior Art

Many devices have been developed to store records, cassettes and compact discs. These devices are characterized by inefficient use of space, unattractive features, poor visibility of stored articles, difficulty of placing the articles into the storage devices and removing the articles therefrom, and relatively poor cost-effective storage. For example, one known cassette storage device is formed of a wire basket and slides within a wire cage. Tape cassettes are stored in vertical orientation within the basket, making the tapes rather difficult to see, difficult to place within the basket and difficult to remove from the basket. The cage makes the entire device relatively large and unattractive.

Other cassette storage devices include boxes in which cassettes are stored in vertical orientation in spaced-apart relationship. The known devices also include racks wherein the cassettes are mounted in horizontal orientation, but within or protruding slightly from enclosures. The structures of these devices makes it difficult to position the cassettes within the enclosures, as well as difficult to remove the cassettes from the enclosures.

The U.S. Pat. No. 4,411,481, to Berkman, issued Oct. 25, 1983, discloses a tray slidably mounted within a drawer and having rectangular bins for storing audio and video cassettes, and video game cartridges. Each bin comprises vertical and horizontal walls, and resilient retaining fingers to retain the stored articles in a vertical orientation.

The U.S. Pat. No. 4,655,345, to Drake et al, issued Apr. 7, 1987, discloses a compact disc storage unit. The unit comprises an outer housing and a number of slots located on the upper and lower surfaces of the housing interior. These slots are used to store compact discs in a vertical face-to-face orientation. A raised central portion located on the upper outside surface of a lower housing connects to rests located on the bottom surface of an upper housing to vertically stack a plurality of housings. Compact discs are placed on slidable members for loading into the unit. A handle on the housing permits transportation of the storage unit.

The U.S. Pat. No. 4,650,072, to Ackeret, issued Mar. 17, 1987, discloses an audio cassette storage magazine comprised of a solid outer housing. Located in the housing is a pair of half-housings. Each half-housing can store four vertically stacked cassettes in horizontal orientation. Tapes are stored horizontally within the half-housings. By opening a door located on each half-housing, a slider on which the tapes rest is partially ejected for ease of tape removal. The outer housing is fixedly mounted by a yoke to a surface underneath a dashboard in the interior of an automobile.

The U.S. Pat. No. 4,647,118, to Kamperman, issued Mar. 3, 1987, discloses tape, disc and record storage boxes comprised of solid walls and a door. When the door is placed in an open position, the contents, which are stored in a vertical orientation, are partially withdrawn by a slide mechanism attached to the door. Storage boxes can be vertically and/or horizontally interlocked by slides and channels located on the outside surface of the boxes.

The U.S. Pat. No. 4,592,600, to Bohnet et al, issued Jun. 3, 1986, discloses stackable video and audio cassette storage boxes with various methods of indicating when a cassette is in each box. In one embodiment of the invention, a storage box has five cassettes stacked horizontally in drawers located within the storage box.

The U.S. Pat. No. 3,114,459, to Kersting, issued Dec. 17, 1963, discloses in part a wire frame for record storage, wherein the records are stored in a face-to-face manner. The wire frame is mounted to a shelf through conventional U-shaped drawer glides mounted to the shelf and the wire rack. A stop mechanism is provided by a small rod inserted into apertures located in the rear portion of each frame drawer glide. The frame motion will stop when the rod comes into contact with the bottom drawer glide. Rearward motion of the frame is stopped by the engagement of bends located at the lower front portion of the wire frame side member with the stationary lower drawer glide.

The U.S. Pat. No. 2,892,548, to Huff, issued Jun. 30, 1959, discloses a collapsible record storage rack. The rack comprises a series of at least seven inverted U-shaped wires mounted on channel-shaped side holders. A base portion comprised of longitudinal and cross-wires is inserted into or removed from the channel-shaped side holders by pulling the side holders laterally apart and pressing the base into place in the side holders.

The U.S. Pat. No. 2,959,293, to VonMeyer, issued Nov. 8, 1960, discloses a record storage rack comprised of two end members held together by two longitudinal rods. The rods are spaced at predetermined vertical and horizontal distances apart. The records sit vertically face-to-face on the rods. The end pieces are then moved to a position adjacent the record jackets to hold the records in place.

The U.S. Pat. No. 3,446,360, to Gutierrez, issued May 27, 1969, discloses a boxlike frame used for record storage. Pivotally mounted transverse slotted record-holding members are located in the box. Records are placed in the slotted portion of the record holders for storage.

Other storage devices are disclosed in U.S. Pat. No. 3,318,453 to Cavanagh, issued May 9, 1967; U.S. Pat. No. 3,347,393 to Frey, issued Oct. 17, 1967; and U.S. Pat. No. 3,800,958 to Dorn, issued Apr. 2, 1974.

Finally, commonly assigned U.S. patent application Ser. No. 07/111,442, filed Oct. 21, 1987, now U.S. Pat. No. 4,887,725 discloses a storage assembly comprising a rack having a series of at least four U-shaped wires in spaced relationship and a track slidably mounting the rack.

SUMMARY OF THE INVENTION

According to the invention, there is provided a storage rack assembly for storing articles such as audio cassettes, video cassettes, and compact disc containers on shelves, cabinets and the like in such a manner that the articles can be stored efficiently on the shelf and yet be accessible when needed, and be visible so that cassettes and disc containers can be easily inserted into or removed from the storage rack. In accordance with the invention, a rack comprises a base, an article support means and at least one pair of side retainer means with the side retainer means being mounted substantially perpendicular to the base and spaced apart a distance to allow a plurality of articles to be inserted between the pair of side retainer means. The rack has an open front and back to permit articles to pass therethrough so that a number of articles can be retained therein. The article support means provides support for at least one of the articles positioned between the pair of side retainer means. An elongated track means mounts the rack for sliding movement generally parallel to the open front and generally perpendicular to the side retainer means. The rack thus can be moved along the track to present the open front for access to one article when the track is mounted on the shelf or in a cabinet.

In the preferred embodiment of the invention, the side retainer means comprises wire forms, typically U-shaped wires, having a pair of legs, each of which has laterally extending feet. The base comprises an elongated support member having means to releasably retain the feet in the elongated support member in perpendicular relationship to the elongated support member. The means to releasably retain the feet comprise channels having an open side for receiving the feet.

The base is preferably an extruded shape with an elongated central portion and elongated inwardly-facing channels at the sides thereof. The base further has laterally-projecting flanges which are received within the track channels.

The article support means is preferably integrally formed with the base and comprises step portions extending along the lateral sides of the base. Articles are positioned on the step portions for storage in the rack.

The track means typically has an elongated flat central portion and inwardly-opening channels at the sides thereof to receive the base of the rack in sliding relationship thereto. Conveniently, the track can be made of an extruded plastic material.

In addition, the track means channels preferably have openings at the ends thereof to facilitate entry of the base into the track means or removal of the base from the track means. The track means preferably has a means such as a screw, for securing the track to the shelf.

A stop means is preferably provided between the track means and the rack to releasably retain the base of the rack within the track when the base is positioned in an extending, telescoping relationship with the track. The stop means is preferably positioned on one end of the track and the base so that the base is releasably retained in the track when the base is in an extended telescoping relationship thereto. The stop means comprises a notch and tab located at an end of an extended plastic base, and an opening in the upper portion of the track channel.

The rack can be used without the track for article storage. A freestanding rack can be set on a shelf or table top and filled with articles.

BRIEF DESCRIPTION OF THE DRAWINGS

The invention will now be described with reference to the accompanying drawings in which:

FIG. 5 is a top plan view of the mounting track of FIG. 2;

FIG. 6 is a sectional end view of the mounting track taken along lines 6—6 of FIG. 5; and FIG. 7 is an enlarged partial front elevational view of the storage rack and mounting track of FIG. 2.

DESCRIPTION OF THE PREFERRED EMBODIMENT

Figure 1:
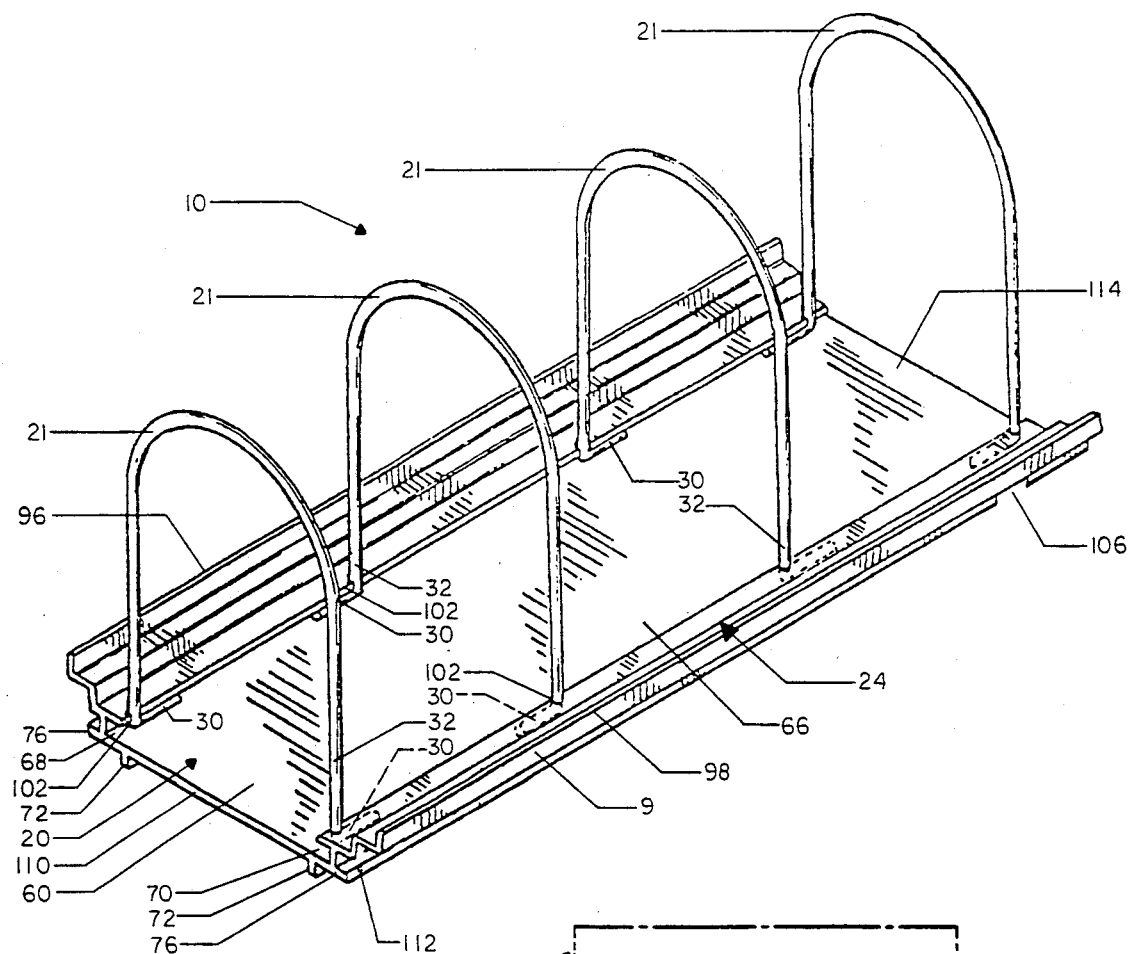
FIG. 1 is a front perspective view of a storage rack in accordance with the invention.
Figure 2:
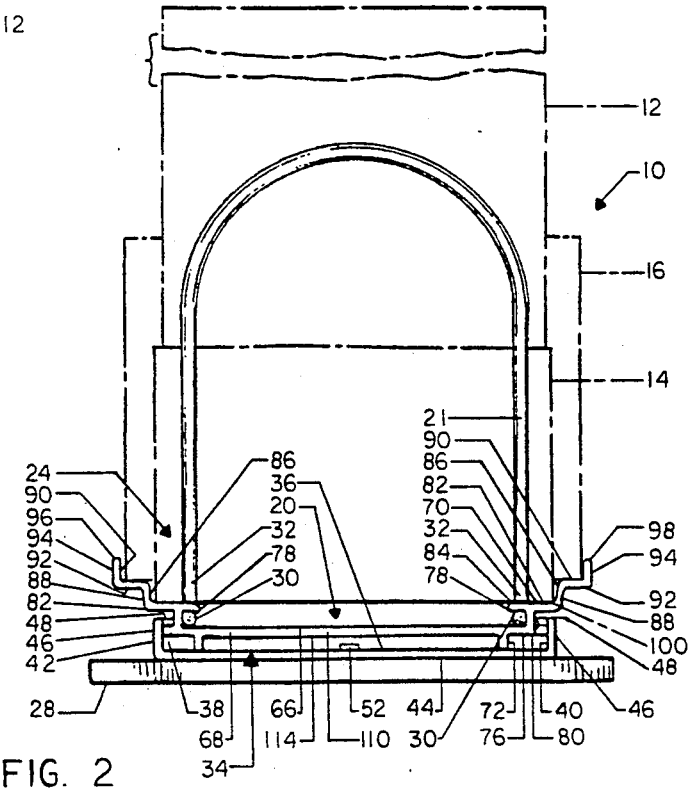
FIG. 2 front elevational view of the storage rack of FIG. 1 and showing a mounting track.
Figure 3:
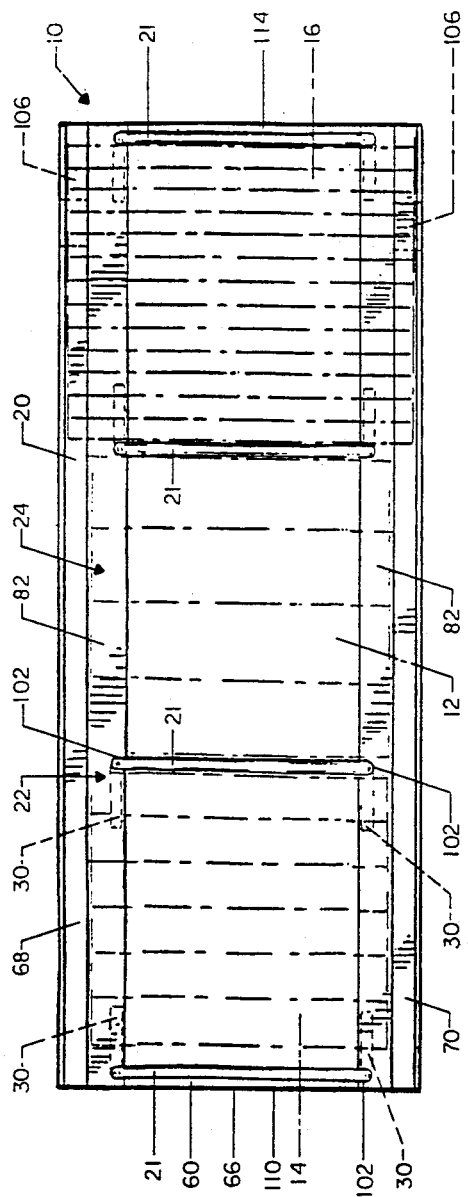
FIG. 3 is a top plan view of the storage rack of FIG. 1 and showing placement of stored articles.
Figure 4:
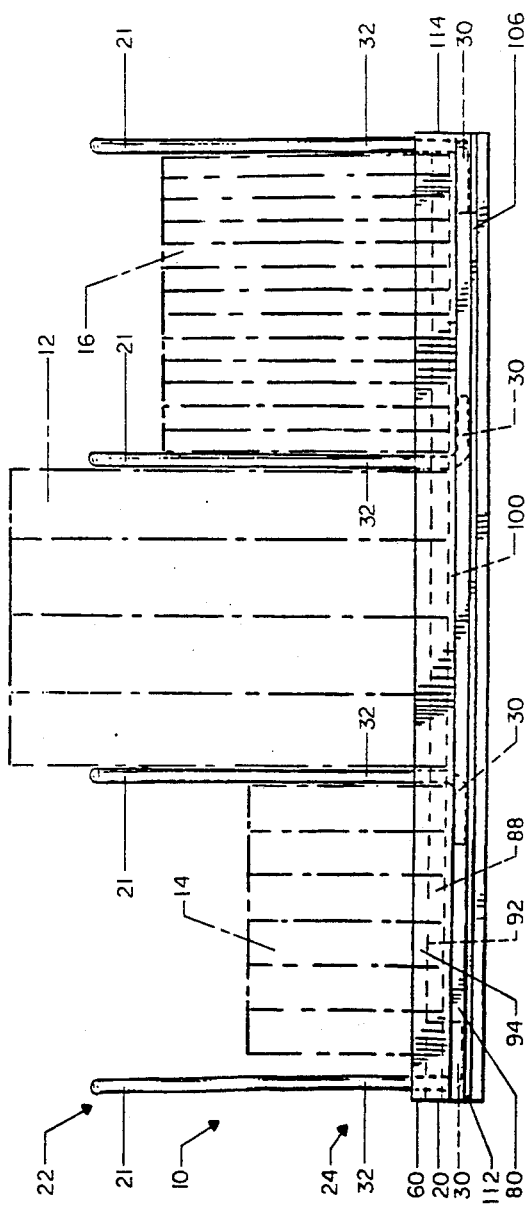
FIG. 4 is a side elevational view of the storage rack of FIG. 1 and showing placement of stored articles.

The principles of the invention are disclosed in a storage rack assembly as depicted in FIGS. 1-7. The assembly includes a storage rack 10 as specifically shown in FIGS. 1 through 4 and 7. As shown in FIGS. 2, 3 and 4, the storage rack 10 enables video cassettes 12, audio cassettes 14 and compact disc containers 16 (each of the cassettes and disc containers being shown in dotted line format) to be simultaneously stored within the rack 10. In this manner, the storage rack 10 provides a convenient and aesthetic means for storing audio/video cassettes and compact discs within a single storage rack. As described in greater detail herein, and as shown primarily in FIGS. 2, 3, 4 and 7, the storage rack 10 can be slidably mounted within a mounting track 34 for convenient storage of articles within a cabinet or on a shelf. Alternatively, however, the storage rack 10 may stand alone for storage of articles such as the cassettes and discs, or for transportation of the same.

Referring to FIG. 1, the storage rack 10 comprises a series of U-shaped wires 21. Each of the U-shaped wires 21 is positioned in a vertical orientation and removably secured to a base 20. Further, each of the U-shaped wires 21 includes an L-shaped foot portion 30 located at a terminating end of a lower portion 32 of each of the legs of the wires 21. In the example embodiment shown in FIG. 1, four U-shaped wires 21 are shown. Further, each pair of adjacent U-shaped wires 21 have their foot portions 30 opposing each other although such an opposing configuration is unnecessary. It is preferable, however, for the four portions 30 of the outermost wires 21 to extend inwardly toward each other. Although FIG. 1 illustrates four U-shaped wires 21, and two pairs of the wires 21, any number of U-shaped wires 21 can be utilized with the storage rack 10 in accordance with the invention, without departing from the novel concepts of the invention. The specific interengagement of the U-shaped wires 21 with the base 20 will be described in subsequent paragraphs herein.

As primarily illustrated in FIGS. 2, 5, 6 and 7, the storage rack assembly includes, in addition to the storage rack 10, an elongated mounting track 34. The mounting track 34 is utilized in a manner such that the storage rack 10 is slidably received within the mounting track 34 for purposes of slidably mounting the rack to a supporting surface 28. The actual sliding engagement will be described in subsequent paragraph herein.

Referring again to FIGS. 2, 5 and 6, the mounting track 34 comprises a flat central portion 36, having a pair of channels 38, 40 formed at opposing lateral sides thereof. Each of the channels 38, 40 is formed by a vertically oriented first flange 46 connected at a lower end to the flat central portion 36. A horizontally oriented second flange 48 is connected to the other end of the first flange 46 and is directed inwardly toward the central portion 36. As will be apparent from subsequent description herein, the slidable mounting of the storage rack 10 with the mounting track 34 permits the rack 10 to be stored within a cabinet (not shown), and yet withdrawn for access to the audio/video cassettes 12, 14 and compact disc containers 16. Further, as shown in FIGS. 2, 5 and 6, the mounting track 34 can be secured to the supporting surface 28 by means of screws 52 located adjacent first and second longitudinal ends 54, 56 of the central portion 36. Alternatively the mounting track 34 can be secured to the supporting surface 28 by any of a number of other suitable connecting means.

As primarily shown in FIG. 5, each of the channels 38, 40 includes a notch 58 located at a first longitudinal end 54 of the mounting track 34. Each of the notches 58 is formed by essentially omitting or "cutting out" a portion of the horizontal second flange 48 of each of the channels 38, 40. The notches 58 are employed to facilitate ease of entry of the storage rack 10 onto the mounting track 34. Specifically, the storage rack 10 is engaged with the mounting track 34 by: (1) placing a rack inner end 60 onto the track central portion 36 at the notches 58; and (2) sliding the rack 10 within the mounting track 34 so that the rack 10 is held in place by the track channels 38, 40.

As further shown in FIG. 5, each of the mounting track channels 38, 40 also includes one or more notches 64 located at varying positions along the lengths of channels 38, 40. Each of the notches 64, in a manner similar to the notches 58, is formed by omitting or "cutting out" a portion of the horizontal second flanges 48 of each of the channels 38, 40. Although the notches 64 can be located at varying positions along the lengths of the channels 38, 40, it is preferable that each notch 64 located along the length of the channel 38 is directly opposite a corresponding notch 64 located along the length of the channel 40. As will be described in subsequent paragraphs herein, the notches 64 function as parts of a "stop" assembly.

Referring to FIGS. 1 and 7, the storage rack 10 includes a lower base 20 comprising a flat central portion 66. Projecting downwardly from the flat central portion 66 are a pair of parallel and longitudinally extending flanges 72, with each of the flanges 72 located adjacent opposing lateral sides of the central portion 66. The flanges 72 provide a vertical support for the storage rack 10 when the rack 10 is slidably engaged with the mounting track 34. Correspondingly, lateral edges 76 of the lower central portion 66 provide lateral stability for slidably engaging the storage rack 10 within the channels 38, 40 of the mounting track 34. As shown primarily in FIG. 1, each of the lateral edges 76 includes a notch 106 positioned a predetermined distance inwardly from a rear edge 110 of the central portion 66. The notches 106 thereby form tabs 112 which function as part of the "stop" assembly described in detail in subsequent paragraphs herein.

Referring primarily to FIG. 7, inwardly facing channels 78 located at opposing lateral sides of the base 20 are each formed by a vertically oriented flange 80 extending upwardly from the base 20, and a horizontal and inwardly directed flange 82 integral with or otherwise connected to an upper end of the corresponding flange 80. At a terminating end of each of the horizontal flanges 82 is a curved lip projection 84. As shown primarily in FIG. 1, a series of notches 102 are located along the longitudinal length of the horizontally oriented flanges 82. The notches 102 are of a size sufficient so as to retain a leg of the U-shaped wires 21. In this manner, with the legs captured in the notches 102, the channels 78 can function so as to receive the foot portions 30 of the U-shaped wires 21.

Referring again to FIG. 7, and as previously described, each of the horizontal flanges 82 is integral with or otherwise connected to a lip projection 84 on one end thereof. The other longitudinally extending end or side of each flange 82 extends laterally outward from the storage rack 10 and forms a series of bilateral step portions 86, 90. More specifically, a first step portion 86 comprises a portion of the horizontal flange 82 and an upwardly extending flange 88 integral with or otherwise connected to the horizontal flange 82. Correspondingly, a second step portion 90 located above and laterally outward from the first step portion 86 is formed from a horizontally oriented and outwardly extending flange 92 integral with or otherwise connected to the upper portion of the vertically oriented flange 88, and an upwardly extending flange 94 integral with or otherwise connected to an end of the horizontal flange 90. As will be described in subsequent paragraphs herein, the step portions 86, 90 are utilized for purposes of storage of items of differing sizes.

As depicted in dotted line format primarily in FIGS. 2, 3 and 4, the video cassettes 12, audio cassettes 14 and compact disc containers 16 can be stored along the base 20 of storage rack 10 between adjacent wires 21. More specifically, the audio cassettes 14 are preferably placed in a face-to-face and upright relationship relative to each other. The cassettes 14, being of the relatively smaller size, can be placed laterally across the storage rack so that each of the cassettes has its opposing lower corners positioned in the first step portions 86 formed by the horizontal flanges 82 and vertical flanges 88.

As also shown in the drawings, each of the video cassettes 12 can be stored with one of its lateral sides 100 extending across the base central portion 66 so that the corners of the cassette 12 are also positioned in the first step portions 86 formed by the flanges 82, 88. In this configuration, the longitudinal axis of each video cassette 12 will extend upwardly. Correspondingly, compact disc containers 16 can be stored so that two opposing lower corners of each disc 16 are positioned in corresponding ones of the second step portions 90. With this configuration, each disc 16 rests on the outwardly extending flanges 92 between upwardly extending flanges 94. Further, although the cassettes 12, 14 and compact discs 16 are shown in the drawings as being segregated between adjacent wires 21, it is possible to combine differing types of articles between any two adjacent U-shaped wires 21.

In the preferred embodiment, the storage rack 10 is of a knowdown type. That is, it can be assembled or disassembled at will by the user. As shown primarily in FIGS. 1 and 3, the storage rack 10 is assembled by inserting the L-shaped foot portions 30 of the U-shaped wires 21 into the inwardly facing base channels 78 of the base 20. The size of the channel interior cross section is approximately the same size as the diameter of the foot portions 30, so as to retain the feet securely. The foot portions 30 are inserted so that the vertical portions 32 of wires 21 register with the notches 102 located on the channel flanges 82. The lip portion 84 of each flange 82 functions to retain the foot portions 30 within the channels 78 so that the U-shaped wires 21 are securely held in a perpendicular orientation with respect to the rack base 20. The storage rack 10 is disassembled by removing the U-shaped wires 21 from the channels 78.

The base 20 is preferably made of a resilient plastic material so that the channels 78 resiliently flex to receive the feet 30 and to compress the feet in place. In addition, the U-shaped wires 21 may be made from a springlike material having an unflexed distance between the lower portions 32 greater than the distance between the channels 78. This differential creates a spring action when the wires 21 are placed in the channels 78. This spring action exerts pressure by the feet 30 against the channel flanges 80 to thereby firmly retain the wires 21 within the channels 78.

Although the preferred embodiment illustrates a knockdown rack, other embodiments may use different methods of securing the U-shaped wires 21 to the rack 10. For example, in an embodiment incorporating a metallic rack base 20, the wires 21 may be welded to the base.

The notches 106 and tabs 112 of the base 20, and the notches 64 of the track 34 form a partial stop for removal of the rack 10 from the track 34. As a rack outer end 114 is withdrawn from the track, the rack inner end 60 comes into contact with the track notches 64. The weight of the rack 10 forces the tabs 112 located at rack end 60 to engage their respective track notches 64. This engagement prevents further withdrawal of the rack 10 until the rack end 114 is raised vertically to disengage the tabs 112 from the notches 64.

As an alternative embodiment, tabs 112 can be located on both longitudinal ends 60, 114 of the rack 10. In this embodiment, either end of rack 10 can serve as the inner end relative to the track 34, while maintaining the ability to provide a partial stop during withdrawal of the rack 10 from the track 34.

While the invention has been described in connection with a preferred embodiment, it will be understood that I do not intend to limit the invention to that embodiment. To the contrary, I intend to cover all alternative modifications and equivalents as may be included within the spirit and scope of the invention as defined by the appended claims.

The embodiments of the invention in which an exclusive property or privilege is claimed are defined as follows:

1. A storage rack assembly for storing articles such as audio cassettes, video cassettes, and compact disc containers, said storage rack assembly comprises a storage rack, for retaining said articles in an upright and face-to-face relationship, wherein said storage rack comprises:
   a base having opposing lateral sides;
   article support means connected to said lateral sides adapted to provide vertical and lateral support to said articles;
   retainer means mounted substantially perpendicular to said base and adapted to provide longitudinal support to said articles;
   said article support means comprises stepped means for vertically and laterally supporting and accommodating said articles of differing sizes in face-to-face relationships;
   said stepped means comprises a pair of elongated sections extending longitudinally along each opposing lateral side of said base, with each of said elongated sections having at least two step portions so as to accommodate said articles having at least two of said differing sizes; and
   each of said retainer means comprises a wire form having a pair of legs, each of said legs having a longitudinally extending foot, and each of said elongated sections comprises means for releasably retaining said feet in said elongated sections.

2. A storage rack assembly according to claim 1 wherein said means for releasably retaining said feet comprises channels formed between said base and said elongated sections.

3. A storage rack assembly according to claim 2 wherein said channels are formed in part by a lip portion curved inwardly and downwardly so as to capture said feet and said channels are formed of a resilient material so that said channels hold said feet at least in part by spring action.

4. A storage rack according to claim 1 wherein said base and stepped portions are integrally formed of a plastic material.

5. In a storage rack assembly for storing articles such as audio cassettes, video cassettes, and compact disc containers on shelves and in cabinets, said storage rack assembly comprising:
   a rack comprising a base, article support means connected to said base and at least one pair of retainer means, said pair of retainer means being mounted substantially perpendicular to said base and in spaced relationship, said rack adapted to retain a plurality of said articles in face-to-face relationship, said article support means providing support for said articles positioned between said at least one pair of said retainer means, the improvement wherein:
   said article support means comprises means for supporting articles of different sizes between said pair of retainer means;
   said storage rack assembly further comprises elongated track means adapted to be mounted on a shelf or in a cabinet and mounting means for slidably mounting said rack to said track means for movement generally perpendicular to said retainer means, whereby said rack can be moved along said track means for external access to said articles when said track means is mounted on a shelf or in a cabinet;
   said track means comprises an elongated flat central portion and inwardly opening channels at the sides thereof to receive said base of said rack in sliding relationship thereto; and
   said base is an extruded shape comprising an elongated central portion, elongated inwardly facing channels and a pair of step portions at the sides thereof, and further having laterally projecting flanges which are received in said track channels.

6. A storage rack assembly according to claim 5 and further comprising means for securing said track means to a supporting surface.

7. A storage rack assembly according to claim 5 wherein said track means channels have openings at the ends thereof to facilitate entry of said base into said track means and removal of said base from said track means.

8. A storage rack assembly according to claim 7 wherein said rack is symmetrical about a central transverse axis so that either end of said rack can be inserted into said track means channels with equal facility.

9. A storage rack according to claim 5 wherein said base and said step portions are integrally formed of a plastic material.

10. In a storage rack assembly for storing articles such as audio cassettes, video cassettes, and compact disc containers on shelves and in cabinets, said storage rack assembly comprising:

a rack comprising a base, article support means and at least one pair of retainer means, said pair of retainer means being mounted substantially perpendicular to said base and in spaced relationship, said rack adapted to retain a plurality of said articles in face-to-face relationship, said article support means providing support for said articles positioned between said at least one pair of retainer means, the improvement wherein:

said article support means comprises means for supporting articles of different sizes between said at least one pair of retainer means;

said storage rack assembly further comprises elongated track means adapted to be mounted on a shelf or in a cabinet and mounting means for slidably mounting said rack to said track means for movement generally perpendicular to said retainer means, whereby said rack can be moved along said track means for external access to said articles once said track means is mounted on said shelf or in said cabinet;

said track means comprises an elongated flat central portion and inwardly opening channels at the sides thereof to receive said base of said rack in sliding relationship thereto;

said storage rack assembly further comprises stop means portioned between said track means and said rack to releasably retain said base within said track means when said base is positioned in an extending, telescoping relationship with said track means; and said stop means comprises a tab on an end of said base and an opening in a corresponding portion of said channel so that said tab engages said opening when said rack tips slightly by gravity when said rack is in said extending, telescoping relationship.

11. A storage rack assembly according to claim 10 wherein said stop means is positioned on each end of said base so that said base is releasably retained in said track when either end of said base is in said extended telescoping relationship with an end of said track means.

12. A storage rack assembly according to claim 10 wherein said stop means is positioned on one end of said base so that said base is releasably retained in said track when said one end of said base is in said extending, telescoping relationship with an end of said track means.

* * * * *